(12) United States Patent
Chien et al.

(10) Patent No.: US 8,339,381 B2
(45) Date of Patent: Dec. 25, 2012

(54) PASSIVE OPTICAL PEN AND USER INPUT SYSTEM USING THE SAME

(75) Inventors: Shi-Yu Chien, Taoyuan County (TW); Wei-Chou Chen, Hsin-Chu (TW)

(73) Assignee: HannStar Display Corp., Yang-Mei, Tao-Yuan Hsien (TW)

( * ) Notice: Subject to any disclaimer, the term of this patent is extended or adjusted under 35 U.S.C. 154(b) by 918 days.

(21) Appl. No.: 11/565,609

(22) Filed: Nov. 30, 2006

(65) Prior Publication Data
US 2008/0129708 A1  Jun. 5, 2008

(51) Int. Cl.
*G06F 3/033* (2006.01)
(52) U.S. Cl. ..................... 345/179; 178/18.01
(58) Field of Classification Search .......... 345/178–183; 178/18.01–18.11, 19.01–19.07; 250/484.4, 250/487.1, 581, 909
See application file for complete search history.

(56) References Cited

U.S. PATENT DOCUMENTS

| | | | |
|---|---|---|---|
| 6,172,668 B1 * | 1/2001 | Baur | 345/182 |
| 6,661,399 B1 * | 12/2003 | Oh et al. | 345/87 |
| 7,348,969 B2 * | 3/2008 | Robrecht et al. | 345/179 |
| 2006/0171152 A1 * | 8/2006 | Suehiro et al. | 362/363 |
| 2007/0024545 A1 * | 2/2007 | Cho et al. | 345/76 |

* cited by examiner

*Primary Examiner* — Kevin M Nguyen
*Assistant Examiner* — Kenneth B Lee, Jr.
(74) *Attorney, Agent, or Firm* — Winston Hsu; Scott Margo (57) ABSTRACT

The present invention provides a passive optical pen for using with a display device, which comprises a handgrip for being held by a user, a reflector positioned on an end of the handgrip, and a transparent shield covering the reflector. The reflector reflects ambient light propagated from the display device toward the display device. The transparent shield keeps the reflector at a distance from the display device, and collects the ambient light.

10 Claims, 8 Drawing Sheets

PASSIVE OPTICAL PEN AND USER INPUT SYSTEM USING THE SAME

BACKGROUND OF THE INVENTION

1. Field of the Invention

This disclosure relates to a passive optical pen, and more particularly to a passive optical pen for using with a display device.

2. Description of the Prior Art

Nowadays, display devices with touch panels have been widely used as a medium of data communication in each scope of consuming electric products, such as personal digital assistants (PDAs), mobile phones, notebook computers, tablet PCs and other wireless portable products. For a touch panel, the functions of inputting and outputting signals are integrated within one medium (screen). The requirement of display devices for miniaturization has pushed touch panels to become one of the most important user input systems.

Figure 1:
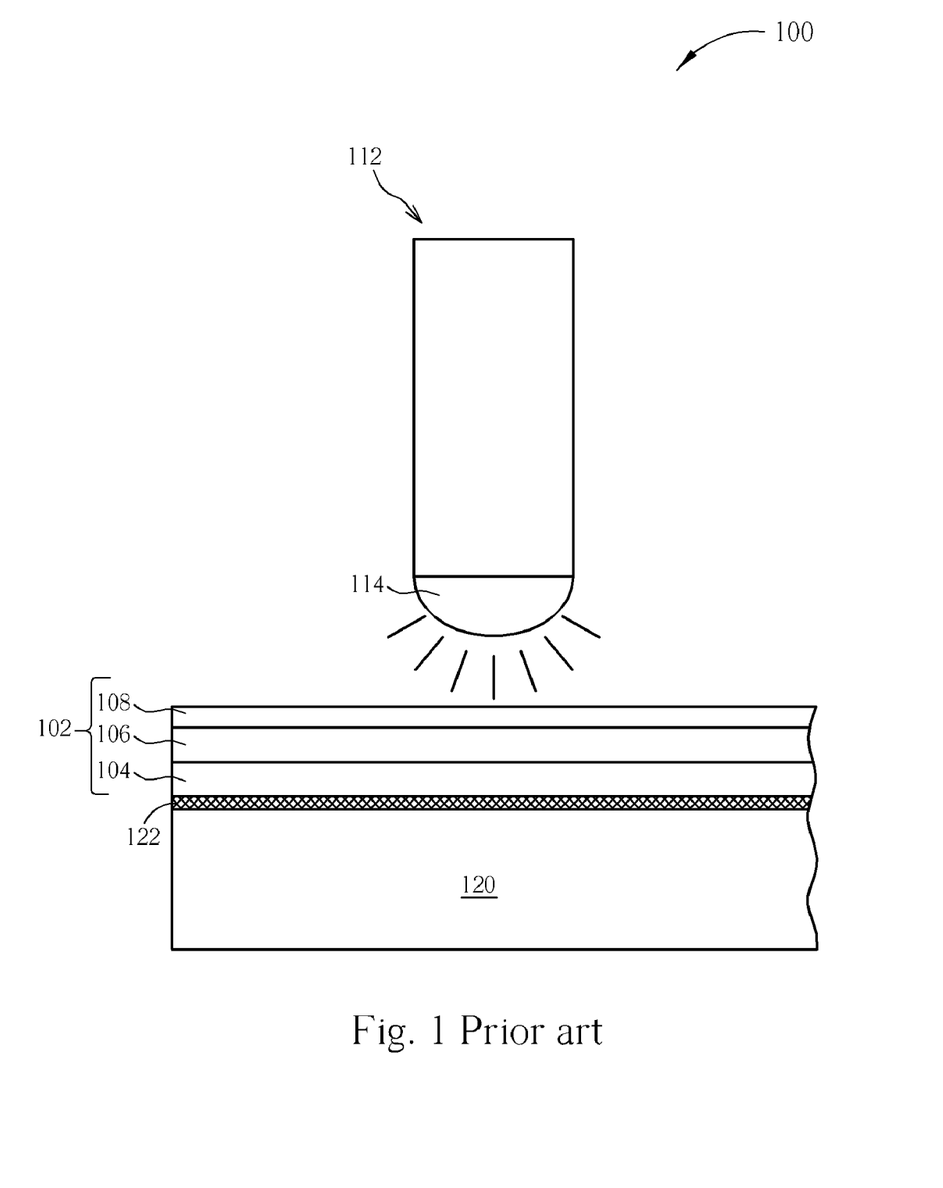
FIG. 1 is a schematic diagram of a traditional user input system having an active optical pen.

Please refer to FIG. 1. FIG. 1 is a schematic diagram of a traditional user input system 100 having an active optical pen 112. The traditional user input system 100 includes a touch panel 102 and an active optical pen 112. The touch panel 102 is usually attached to a surface of a display panel 120 by an adhesive layer 122, and includes a glass substrate 104, a detecting layer 106 and a protecting layer 108. The detecting layer 106 has a plurality of photo sensors and a photo-detecting circuit (not shown in the figure) for detecting light propagated from the outside. Meanwhile, the active optical pen 112 includes a light source 114 to radiate light toward the touch panel 102. Since the detecting layer 106 of the touch panel 102 could sense positions of the light radiated from the active optical pen 112, a user can interact with the user input system 100 utilizing the active optical pen 112.

Because the prior art active optical pen 112 must include a light source 114 to radiate light, it is necessary for the active optical pen 112 to couple with a power source by a wire, or to include a battery inside. Therefore, the prior art active optical pen 112 has the disadvantages listed as follows. First, the active optical pen 112 is heavy and cumbersome, so miniaturization of the active optical pen 112 is limited. The traditional user input system 100 including a cumbersome active optical pen 112 is inconvenient for portable products. Secondly, the prime cost of the active optical pen 112 including a light source 114 and a power system is expensive. Thirdly, there is further a power consumption of the active optical pen 112 during the input operation.

SUMMARY OF THE INVENTION

It is therefore a primary objective of the claimed invention to provide a passive optical pen to solve the aforementioned problem. In the invention, a passive optical pen can reflect light propagated from a backlight module of a display device toward a plurality of photo sensors.

In one aspect, the present invention provides a passive optical pen for using with a display device, which comprises a handgrip for being held by a user, a reflector positioned on an end of the handgrip, and a transparent shield covering the reflector. The reflector reflects ambient light propagated from the display device toward the display device. The transparent shield keeps the reflector at a distance from the display device, and collects the ambient light.

In another aspect, the present invention provides a user input system, which comprises a passive optical pen and at least a display device. The passive optical pen comprises a handgrip for being held by a user, a reflector positioned on an end of the handgrip, and a transparent shield covering the reflector. The reflector collects light and emits the light through a nib of the passive optical pen. The transparent shield keeps the reflector at a distance from the nib of the passive optical pen. The display device comprises a backlight module, and a plurality of photo sensors, which detects light reflected by the passive optical pen.

The above-mentioned passive optical pen can further comprise a phosphor material near the nib of the pen to emit light passively.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
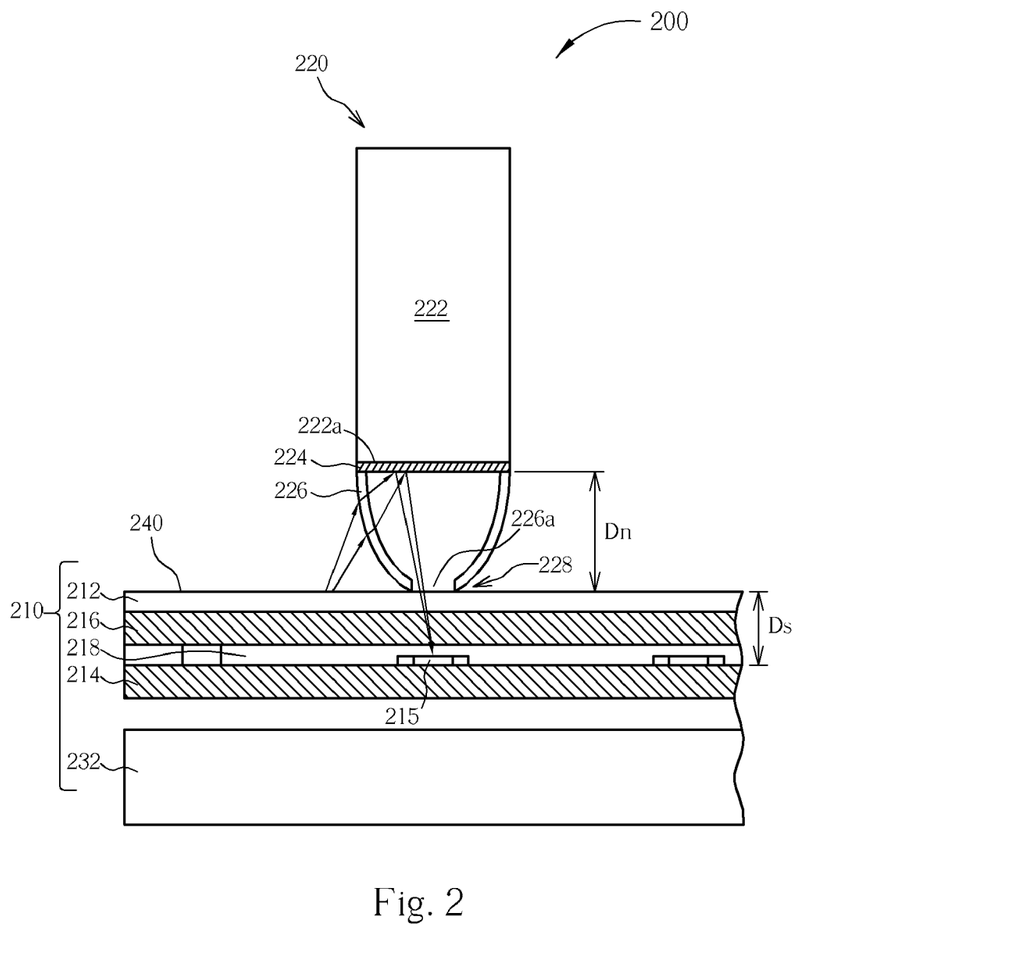
FIG. 2 is a schematic cross-sectional diagram of a user input system according to the first preferred embodiment of the present invention.

Please refer to FIG. 2. FIG. 2 is a schematic cross-sectional diagram of a user input system 200 according to the first preferred embodiment of the present invention. As shown in FIG. 2, the user input system 200 has at least a display device 210 and a passive optical pen 220 for using with the display device 210.

The display device 210 contains a bottom substrate 214 (thin film transistor substrate), a top substrate 216 (color filter substrate) positioned above the bottom substrate 214 in parallel, a liquid crystal layer 218 filled between the top substrate 216 and the bottom substrate 214, a polarizer 212 covering a upper surface of the top substrate 216, a backlight module 232, and a plurality of photo sensors 215 positioned on a upper surface of the bottom substrate 214 for detecting light. The backlight module 232 can radiate light to display images of the display device 210, and to be reflected by the passive optical pen 220. An exterior surface of the display device 210 (that is an exterior surface of the polarizer 212) is an input surface 240 for the passive optical pen 220 to operate thereon. The display device 210 can further have a photo-detecting circuit (not shown in the figure) coupled to the photo sensors 215 for determining the location of the light reflected by the passive optical pen 220. A sensor distance between the photo sensors 215 and the input surface 240 is defined as Ds.

The passive optical pen 220 includes a handgrip 222 for being held by a user, a reflector 224 positioned on an end of the handgrip 222, and a transparent shield 226 enclosing the reflector 224. Any suitable material can be used to form the handgrip 222, and it may be preferred that the handgrip 222 is configured such that it is capable of being easily held and maneuvered by a human hand. The reflector 224 collects ambient light, which includes light beams propagated from the display device 210 and light beams propagated from the surrounding, and reflects the light through a nib 228 of the passive optical pen 220 toward the display device 210. In this embodiment, the end of the handgrip 222 near the nib 228 has a flat surface 222a, and the reflector 224 is a flat reflector deposited toward the nib 228. The reflector 224 can be a flat mirror disposed closely on the surface 222a, or a reflection coating coated on the flat surface 222a. Any suitable reflective material may be included, such as metal, polymeric, etc.

Meanwhile, the transparent shield 226 is a cambered shell adjacent to and fixed to the handgrip 222, where the transparent shield 226 might be adhered to the handgrip 222, or the handgrip 222 might be screwed in the transparent shield 226. The cambered shell has an opening 226a in the nib 228, where the reflector 224 makes the ambient light propagate through the opening 226a. The opening 226a may be of any suitable shape, such as circular, rectangular, polygonal, or cylindrical. The transparent shield 226 is configured to keep the reflector 224 in a nib distance Dn from the nib 228 of the passive optical pen 220 so that the reflector 224 can be kept at a distance from the display device 210 during operation. The transparent shield 226 can include any suitable material or materials, e.g., glass, polymeric. In some embodiments, the transparent shield 226 can even include one or more optical fibers.

In operation, the nib 228 of the passive optical pen 220 is proximate an input surface 240 of the display device 210. The nib 228 can either be in contact with the input surface 240 or at least within a distance from the input surface 240 that is sufficiently small so that the reflected light is easily detectable.

Figure 3:
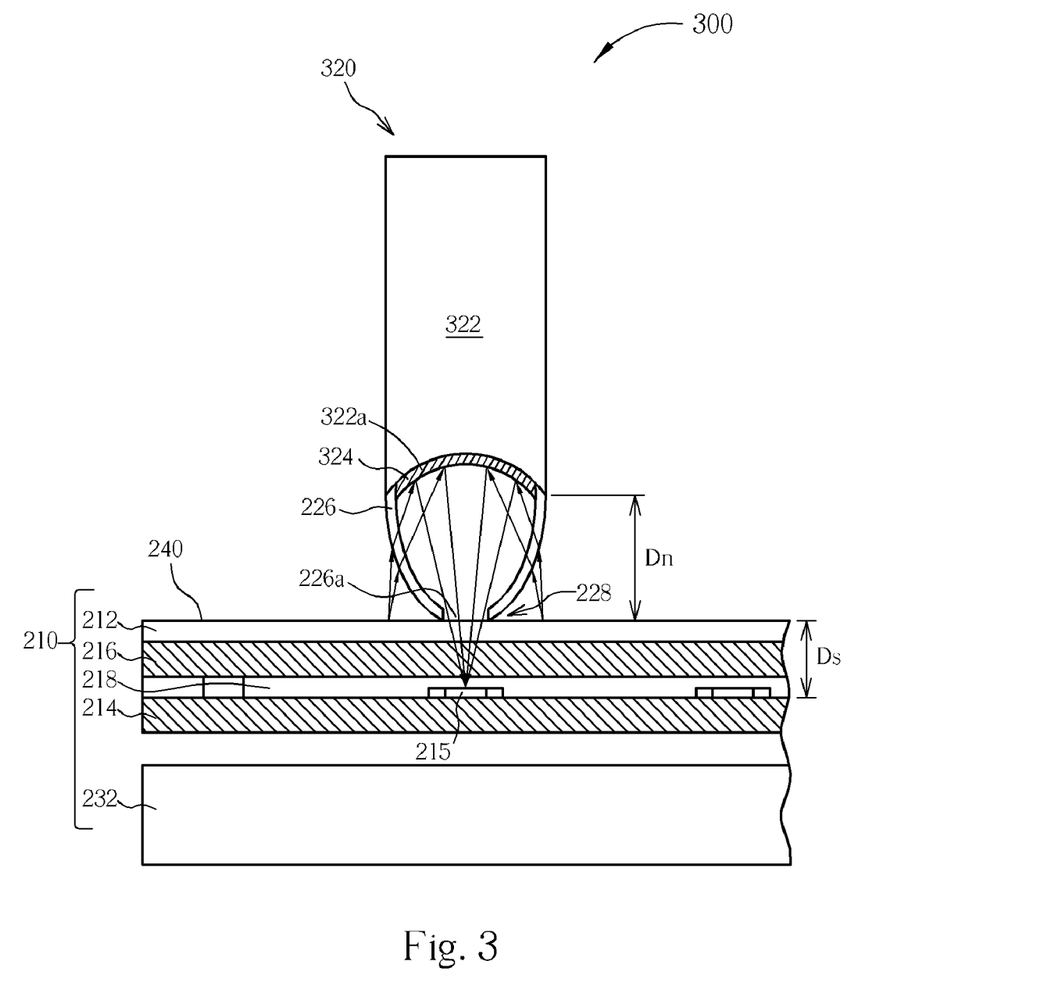
FIG. 3 is a schematic cross-sectional diagram of a user input system according to the second preferred embodiment of the present invention.

Please refer to FIG. 3. FIG. 3 is a schematic cross-sectional diagram of a user input system 300 according to the second preferred embodiment of the present invention. The passive optical pen 320 in this embodiment is similar to the passive optical pen 220 in the first embodiment (shown in FIG. 2), wherein the same labels will be carried to designate the same elements. The difference between the passive optical pen 320 of this embodiment and the passive optical pen 220 of the first embodiment is essentially that the reflector 324 is a concave mirror toward the nib 228, and the surface 322a of the handgrip 322 adjacent to the reflector 324 is a corresponding concave surface. In order to gain a proper reflected effect to the photo sensors, the focal length of the reflector 324 is preferred to approximate the sum of the sensor distance Ds and the nib distance Dn.

Figure 4:
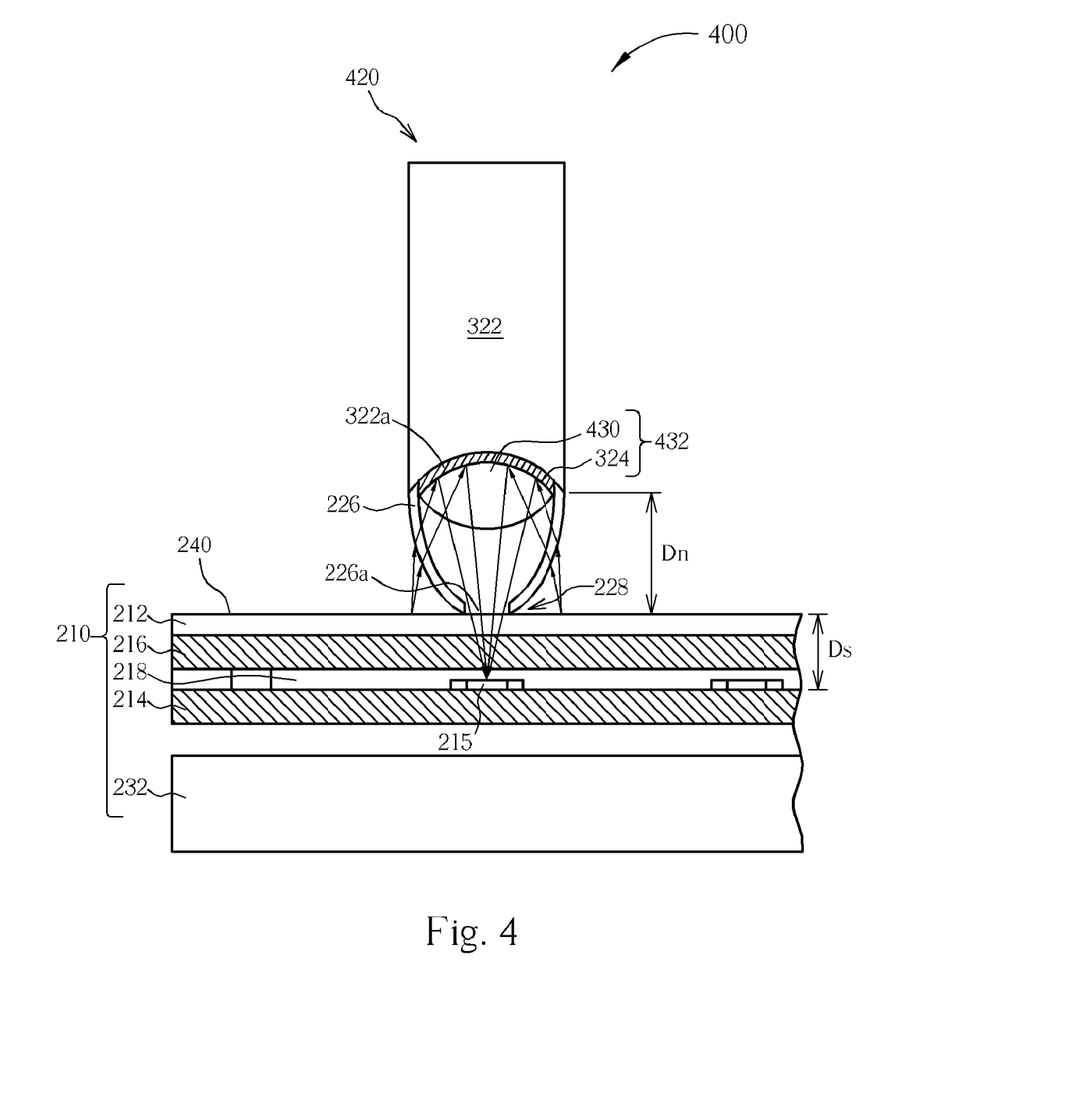
FIG. 4 is a schematic cross-sectional diagram of a user input system according to the third preferred embodiment of the present invention.

Please refer to FIG. 4. FIG. 4 is a schematic cross-sectional diagram of a user input system 400 according to the third preferred embodiment of the present invention. The passive optical pen 420 in this embodiment is similar to the passive optical pen 320 in the second embodiment (shown in FIG. 3), wherein the same labels will be carried to designate the same elements. The difference between the passive optical pen 420 of this embodiment and the passive optical pen 320 of the second embodiment is essentially that the transparent shield 226 of the passive optical pen 420 further comprises a light-concentrating component 430 that is surrounded by the transparent shield 226 and neighbors the reflector 324. Any suitable shape can be used to form the light-concentrating component 430, such as a convex lens, a plurality of lenses, a prism, or a plurality of prisms. In addition, any suitable material can be included to form the light-concentrating component 430, such as glass, or polymer.

The reflector 324 and the light-concentrating component 430 can be taken as a compound device 432 that collect the ambient light toward the display device 210, and a combined focal length of the compound device 432 is defined as F. In order to gain a proper reflected effect to the photo sensors 215, the combined focal length F is preferred to approximate the sum of the sensor distance Ds and the nib distance Dn.

Figure 5:
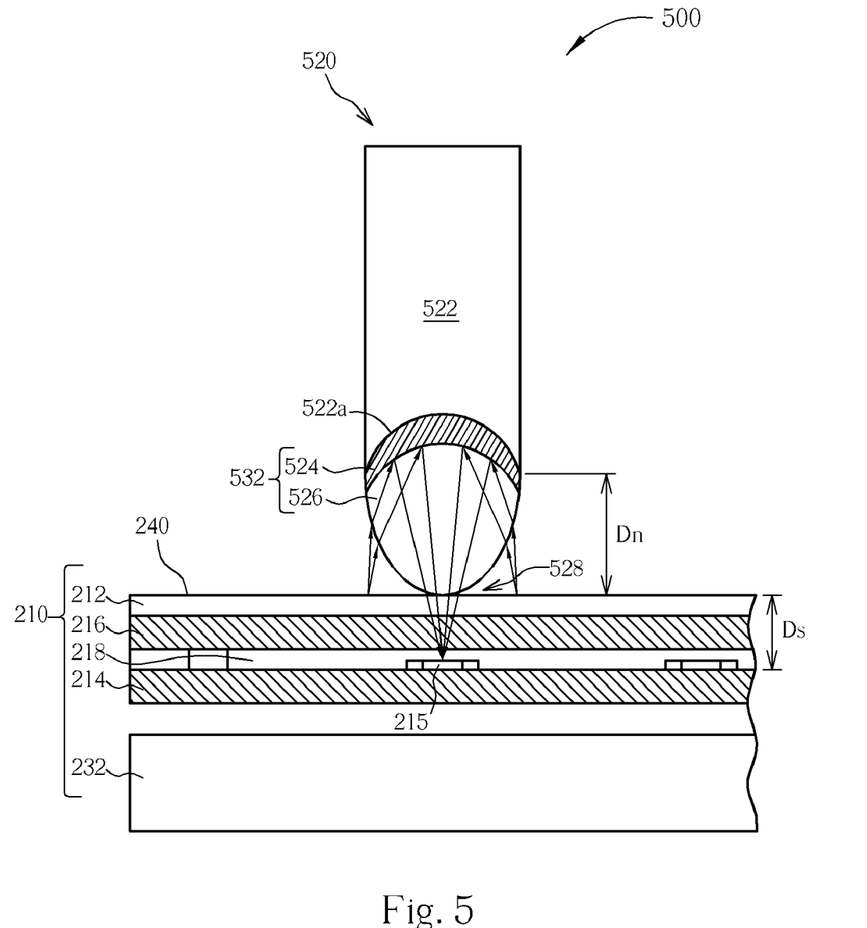
FIG. 5 is a schematic cross-sectional diagram of a user input system according to the fourth preferred embodiment of the present invention.

Please refer to FIG. 5. FIG. 5 is a schematic cross-sectional diagram of a user input system 500 according to the fourth preferred embodiment of the present invention. As shown in FIG. 5, the user input system 500 has at least a display device 210 and a passive optical pen 520 for using with the display device 210. The display device 210 in this embodiment is similar to the display device 210 in the second embodiment, wherein the same labels will be carried to designate the same elements.

The passive optical pen 520 includes a handgrip 522 for being held by a user, a reflector 524 positioned on an end of the handgrip 522, and a transparent shield 526 covering the reflector 524. Any suitable material can be used to form the handgrip 522, the reflector 524 or the transparent shield 526. In this embodiment, the end of the handgrip 522 near a nib 528 of the passive optical pen 520 has a concave surface 522a, and the reflector 524 is a concave mirror deposited toward the nib 528. The reflector 524 can be a concave mirror disposed closely on the surface 522a, or a reflection coating coated on the concave surface 522a. The reflector 524 collects ambient light, which includes light beams propagated from the display device 210 and light beams propagated from the surrounding, and reflects the light through the nib 528 toward the display device 210.

Meanwhile, the transparent shield 526 is a convex lens adjacent to the reflector 524 and fixed to the handgrip 522, where the transparent shield 526 might be adhered to the handgrip 522, the reflector 524, or the handgrip 522 might be screwed in the transparent shield 526. The transparent shield 526 is configured to keep the reflector 524 in a nib distance Dn from the nib 528 of the passive optical pen 520, and to concentrate the ambient light. The reflector 524 and the transparent shield 526 can be taken as a compound device 532 that collect the ambient light toward the display device 210, and a combined focal length of the compound device 532 is defined as F. The compound device 532 reflects the ambient light to propagate through the nib 528 of the passive optical pen 520. In order to gain a proper reflected effect to the photo sensors 215, the combined focal length F is preferred to approximate the sum of the sensor distance Ds and the nib distance Dn.

Figure 6:
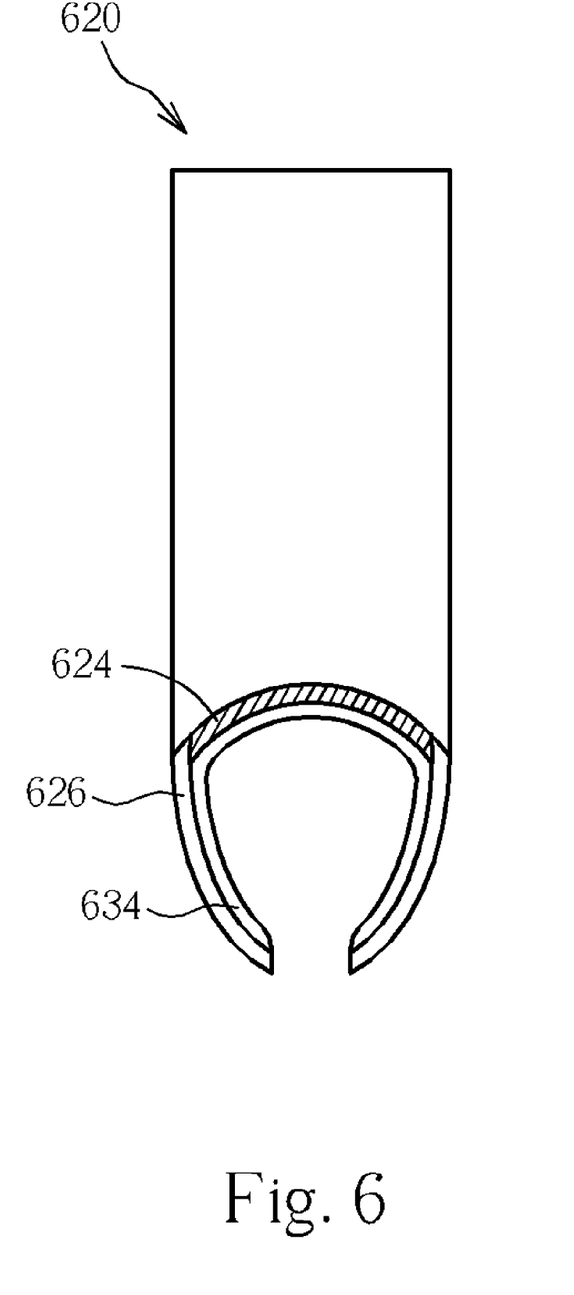
FIG. 6 is a schematic cross-sectional diagram of passive optical pen according to the fifth preferred embodiment of the present invention.
Figure 7:
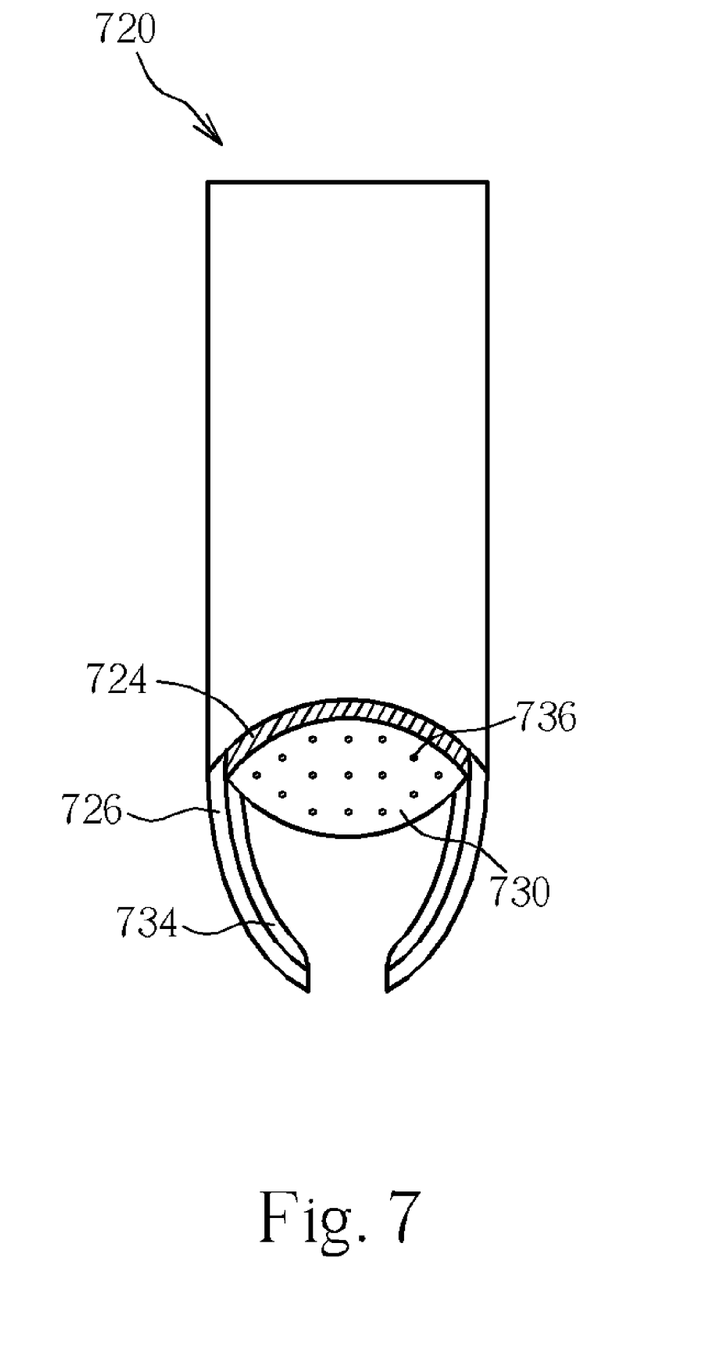
FIG. 7 is a schematic cross-sectional diagram of passive optical pen according to the sixth preferred embodiment of the present invention.
Figure 8:
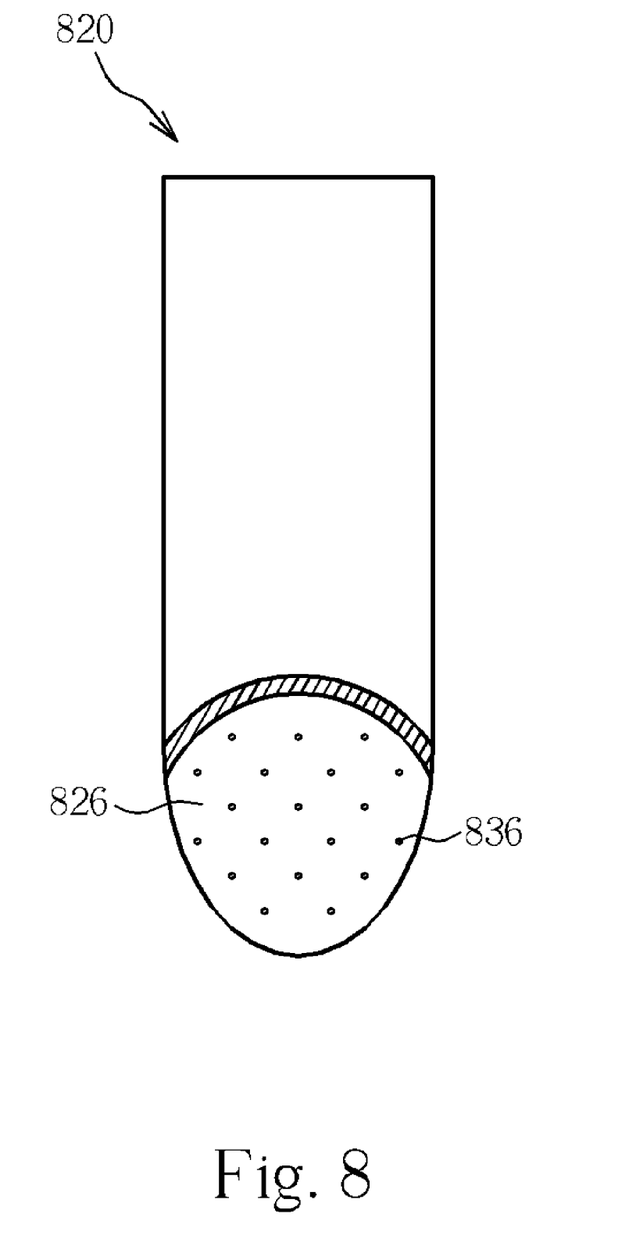
FIG. 8 is a schematic cross-sectional diagram of passive optical pen according to the seventh preferred embodiment of the present invention.

Any of the passive optical pens in the above-mentioned embodiments can further include a plurality of phosphor dopants, or a phosphor coating located near the nib of the passive optical pen so as to emit light passively on the relative dark regions of the input surface 240. Please refer to FIG. 6 through FIG. 8. FIGS. 6-8 are schematic cross-sectional diagrams of passive optical pens 620, 720, 820 according to the fifth, the sixth, and the seventh preferred embodiments of the present invention respectively. As shown in FIG. 6, the passive optical pen 620 further includes a phosphor coating 634 that is coated on the reflective surface of the reflector 624, and on the inner surface of the transparent shield 626. In other embodiments, the phosphor coating 634 can be deposited on the outer surface of the transparent shield 626. As shown in FIG. 7, the passive optical pen 720 includes a plurality of phosphor dopants 736 that is doped in the convex lens 730, and a phosphor coating 734 that is coated on the inner surface of the transparent shield 726. As shown in FIG. 8, the passive optical pen 820 includes a plurality of phosphor dopants 836 that is doped in the transparent shield 826. The phosphor coatings 634 and 734 are made by transparent phosphor that can allow light to propagate through, absorb energy from light, and emit visible light slowly. The phosphor dopants 736 and 836 are made by tiny phosphor particles that absorb energy from light, and emit visible light slowly. As a result, the passive optical pen 620, 720 and 820 can input the user's command on the relative dark regions of the input surface 240 without electrical power consumption.

The display device in the above-mentioned embodiments is an input-sensor-integrated liquid crystal display panel, where the photo sensors are integrated in liquid crystal display panel. In other embodiments, the display device can be a display device including a display panel and a tough panel attached to a surface of the display panel, where the tough panel encloses the photo sensors. Moreover, the display device can further integrate a resistance detecting circuit, a capacitance detecting circuit, or a sound wave detecting circuit.

Because the passive optical pen in the present invention can collect light and emit the light through the nib toward the input surface without establishing a light source in the pen, the passive optical pen has no need to couple with a power source or to include a battery inside. Therefore, both the volume and the weight of the passive optical pen are decreased. Since the inner light source and the power system are not required, the prime cost of the passive optical pen is greatly decreased. Furthermore, there is no power consumption of the passive optical pen when a user inputs his commands into the user input system. On other hand, the phosphors integrated in the passive optical pen can passively emit light, which is sensed by the photo sensors of the display device, so the passive optical pen can further input the user's command in a transient dark. In summary, it is more convenient and cheaper for a user to take the passive optical pen along with the user input system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A passive optical pen for using with a display device, comprising:
   a handgrip;
   a reflector positioned on an end of the handgrip;
   a convex lens enclosing the reflector for keeping the reflector away from the display device, wherein the convex lens contacts a surface of the reflector, and the convex lens is employed to concentrate ambient light toward the reflector and to concentrate the ambient light reflected from the reflector, wherein the reflector has a reflecting concave surface facing the convex lens and the reflecting concave surface is completely covered by the convex lens; and
   a plurality of phosphor dopants doped in the convex lens to emit light passively.

2. The passive optical pen of claim 1, wherein the reflector is a concave mirror.

3. The passive optical pen of claim 1, wherein the reflector is disposed closely on a surface of the handgrip.

4. The passive optical pen of claim 1, wherein the reflector is a reflection coating disposed on a surface of the handgrip.

5. The passive optical pen of claim 1, wherein the convex lens comprises a nib on the opposite side to the reflector.

6. A passive optical pen for using with a display device, comprising:
   a handgrip;
   a reflector positioned on an end of the handgrip;
   a transparent shield covering the reflector for keeping the reflector at a distance from the display device, wherein the transparent shield comprises a convex lens contacting a surface of the reflector, and the convex lens is employed to concentrate ambient light toward the reflector and to concentrate the ambient light reflected from the reflector, wherein the reflector has a reflecting concave surface facing the convex lens and the reflecting concave surface is completely covered by the convex lens; and
   a phosphor coating coated on a surface of the transparent shield, wherein the phosphor coating absorbs energy from light to emit light passively.

7. The passive optical pen of claim 6, wherein the reflector is a concave mirror.

8. The passive optical pen of claim 6, wherein the reflector is disposed closely on a surface of the handgrip.

9. The passive optical pen of claim 6, wherein the reflector is a reflection coating disposed on a surface of the handgrip.

10. The passive optical pen of claim 6, wherein the convex lens comprises a nib on the opposite side to the reflector.

* * * * *